Nov. 30, 1965     J. C. RILL, JR., ETAL     3,221,085
PROCESS OF MAKING AN INSULATED CABINET
Original Filed Nov. 14, 1957     2 Sheets-Sheet 1
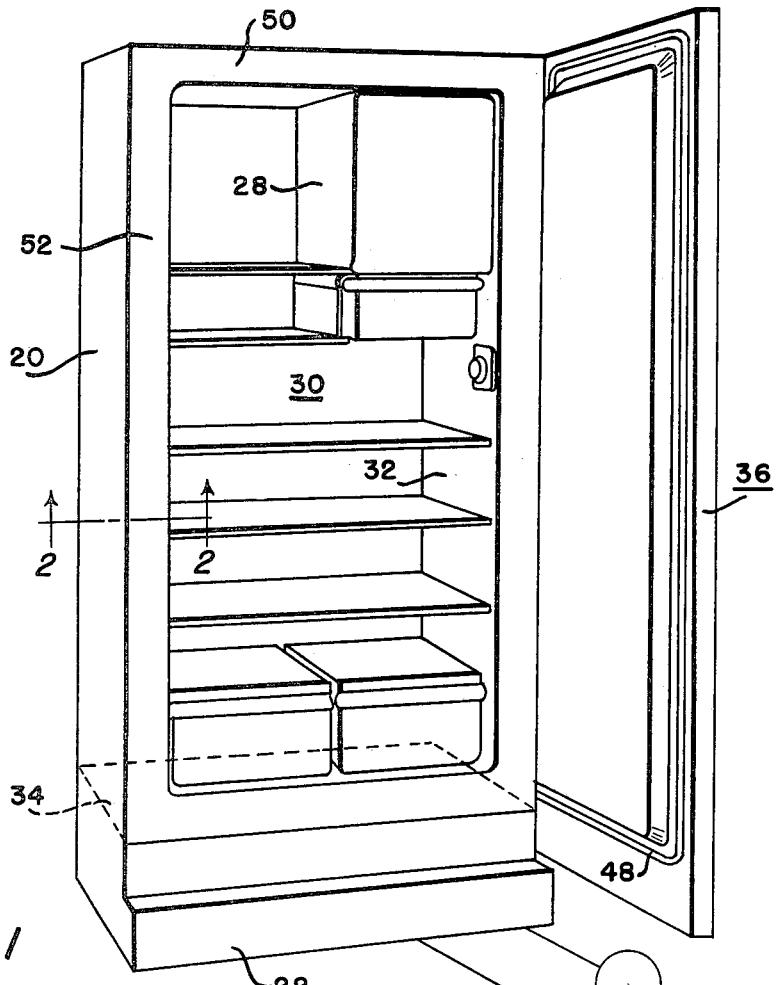
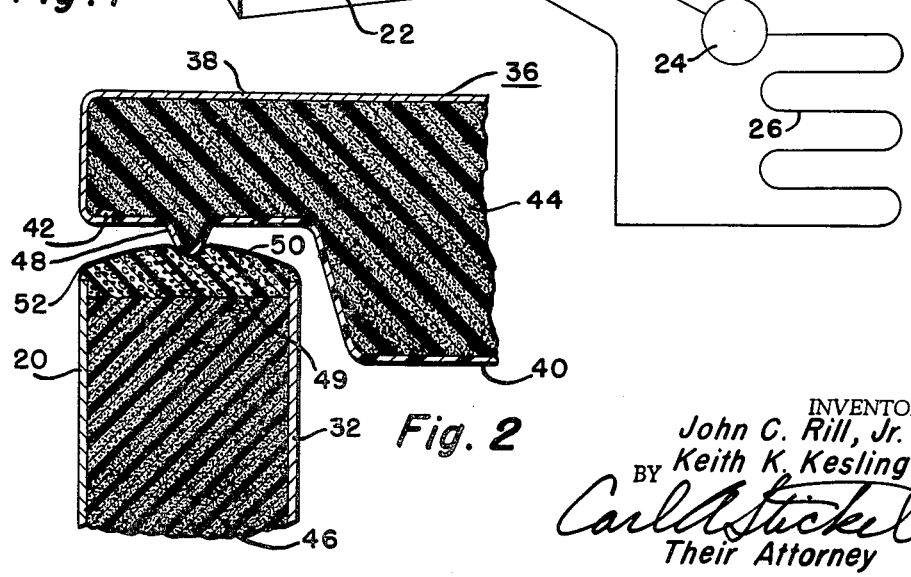
INVENTORS
John C. Rill, Jr.
BY Keith K. Kesling
Carl A. Stickel
Their Attorney Nov. 30, 1965    J. C. RILL, JR., ETAL    3,221,085
PROCESS OF MAKING AN INSULATED CABINET
Original Filed Nov. 14, 1957    2 Sheets-Sheet 2

INVENTORS
John C. Rill, Jr.
Keith K. Kesling
BY Carl A. Stickel
Their Attorney 3,221,085
PROCESS OF MAKING AN INSULATED
CABINET
John C. Rill, Jr., and Keith K. Kesling, both of Dayton,
Ohio, assignors to General Motors Corporation, Detroit, Mich., a corporation of Delaware
Continuation of abandoned application Ser. No. 22,892,
Apr. 18, 1960, which is a division of application Ser.
No. 696,548, Nov. 14, 1957, now Patent No. 2,962,183,
dated Nov. 29, 1960. This application Aug. 28, 1961,
Ser. No. 134,408
2 Claims. (Cl. 264—45)

This application is a continuation of our copending application S.N. 22,892 filed April 18, 1960, now abandoned, which is a division of our application S.N. 696,548 filed November 14, 1957, which issued on November 29, 1960, as Patent 2,962,183.

This invention pertains to refrigerating apparatus and more particularly to a method of making insulated refrigerator cabinets in which a foamed insulation is cast within the walls.

Some modifications of the new foamed polyurethanes have insulation characteristics sufficient to make possible low cost, thin walled refrigerator cabinets having heat leaks lower than the present thick walled cabinets insulated with glass or mineral wool. These new foamed polyurethanes have excellent adhesion properties, are low in weight, high in structural strength for their weight, and have high insulating properties. However, full advantage of these properties cannot be obtained by merely filling the insulation space of present cabinets with these or other equivalent foamed materials.

It is an object of this invention to provide a simple, inexpensive method of making a refrigerator cabinet in which the extensive assembly of many small parts and screws is eliminated and replaced by the cast foamed material having binding, structural and insulating properties.

It is another object of this invention to provide a simple method of making refrigerator cabinets in which the mixture of liquids which reacts to form the foam is introduced through the open back and distributed throughout the insulation space while the liner and outer shell lie face-down.

These and other objects are attained in the examples shown in the drawings in which a film of flexible material extends across the intervening gap between and is bonded to the front edges of both a plastic box-shaped liner having a front opening and an outer shell having front and rear openings. The assembly is then placed with the flexible film and the front openings face-down so that it rests over a support or mold upon the front edges. The support or mold may have a cavity of the shape complementary to the form which it is desired that the cabinet have between the front edges of the liner and the outer shell. Alternatively, an adherent film may be applied to the support or mold.

In this position there is flowed a fluid mixture of material capable of forming a foamed synthetic elastomeric polymer of the polyester or polyether class in an amount sufficient to form a resilient door seal upon the rear face of the adherent film extending between the front edges of the liner and outer shell. After this material has foamed and set, there is also applied to this elastomer a thin layer of polyvinyl alcohol. After this polyvinyl alcohol has set, there is introduced through the open back of the outer shell a mixture of materials which will form a semi-rigid or rigid foamed polyurethane having high structural, insulating and adhesion properties sufficient in amount to fill the remainder of the space and to cover the back of the liner to a sufficient depth to provide adequate insulation. A back cover is preferably applied immediately after introduction of the mixture. The chemical reaction causes the urethane foam to expand to the inner face of the back panel to which it adheres and retains in place after solidification. After it sets, the foamed material will support the liner and the back panel in place without any assistance and the elastomeric material will form a resilient surface between the film and the rigid insulation which will form a seal with the contacting surface of the door when the door is closed. The joint between the back cover and the outer shell is sealed with polyvinyl alcohol to seal the insulation.

Further objects and advantages of the present invention will be apparent from the following description, reference being had to the accompanying drawings, wherein a preferred form of the present invention is clearly shown.

In the drawings:

FIGURE 1 is a front perspective view of a refrigerator cabinet embodying one form of my invention;

FIGURE 2 is a fragmentary enlarged sectional view taken substantially along the line 2—2 of FIGURE 1, with the door in closed position;

Figures 3, 4, 5:
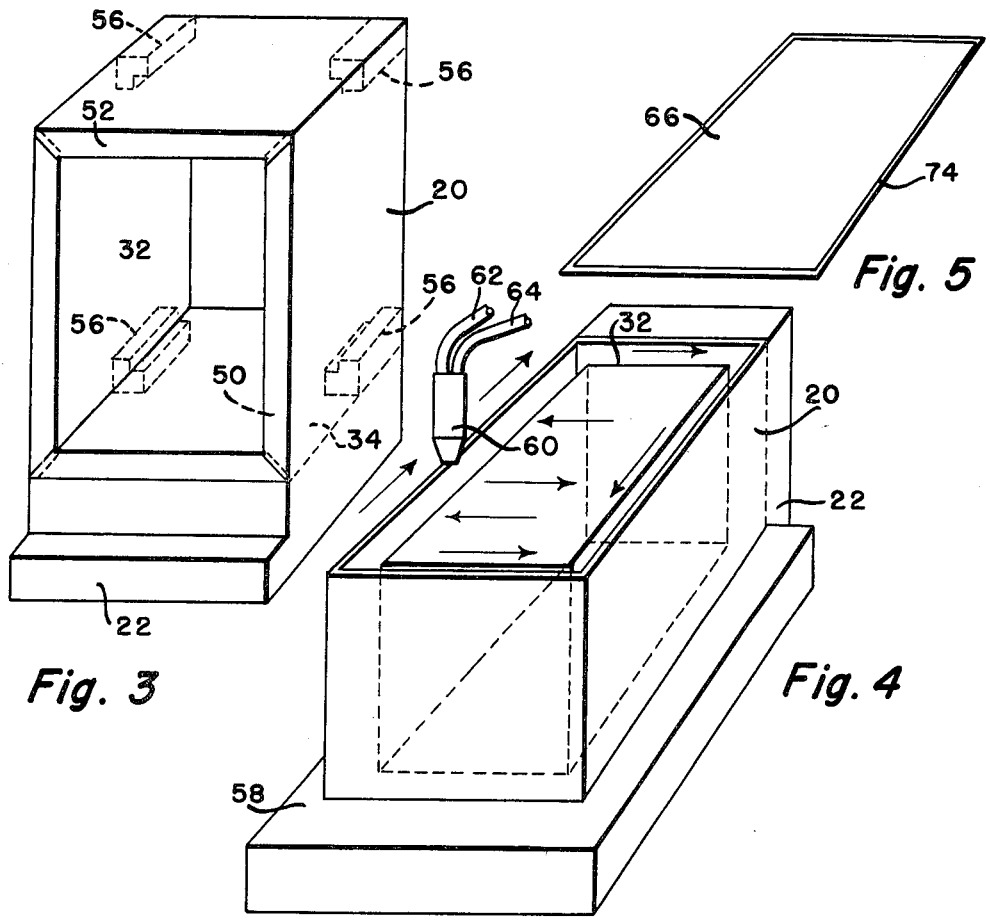
FIGURE 3 is a front diagrammatic perspective view of the liner and shell in the position in which the film of flexible material is applied to the front edges of the outer shell and inner liner.
FIGURE 4 is a perspective view showing the second step of the assembly with the liner and outer shell face-down upon a support showing the introduction of the insulation material.
FIGURE 5 is a perspective view of the back of the cabinet.

It is well known that a wide variety of polymeric materials such as polyesters, polyesteramides, polyalkylene glycols, castor oil and other materials having a plurality of reactive hydrogen groups may be reacted with organic polyisocyanates in the presence of accelerators and/or cross linking agents to produce foamed polyurethane plastics which may have a density ranging from about 1 to 20 lbs. per cu. ft. and are valuable for use as insulation and structural material. The formation of polyurethane plastics involves a series of complex physical and chemical reactions wherein heat is evolved and the cellular or foamed character thereof results from the formation and evolution of carbon dioxide gas in the course of the reaction as a consequence of a reaction between the carboxyl and isocyanate groups and/or between water and isocyanate groups. Foamed or cellular plastics of this type are described in, for example, the U.S. Patents 2,764,-565, 2,772,245, 2,642,403 and 2,639,252.

Since a major portion of the volume of a polyurethane foam suitable for use as insulation material consists of voids filled with carbon dioxide gas, it is apparent that the effectiveness of the insulation is to a large extent dependent on the coefficient of thermal conductivity of the carbon dioxide gas or other gas contained in the voids of the insulation material.

Although several preferred examples of such material are specified in the following specification, the invention is not limited thereto but extends to their equivalents and substitutes, some of which provide sufficient resiliency and adhesion to serve as a door seal or sufficient adhesion, structural strength and insulating properties for use as a structural insulating material which can be cast in place.

The refrigerator shown in completed form in FIG. 1 may include any particular details of construction, but as an example, includes an outer shell 20 which may be of metal, plastic or other suitable material having a desirable exterior finish such as porcelain or other types of enamel or lacquers. The outer shell preferably is rectangular in shape and has a top and sides and a portion 22 extending beneath the storage compartment door opening behind which is the motor-compressor condenser unit, shown diagrammatically as the motor-compressor 24 for compressing the refrigerant and forwarding the refrigerant to the condenser 26. These are located off to the side of FIG. 1, but actually will be located beneath the insulation of the storage compartment behind the portion 22. The condenser 26 is connected by a small capillary conduit to the evaporator 28 located in the storage compartment 30 provided with numerous shelves and storage drawers which are supported by the inner liner 32.

The inner liner 32 may be of either metal or plastic provided with a porcelain or other enamel coating, if desired, and may have wall protrusions specially formed to support the shelves and drawers. The shell has a transverse bottom wall 34 immediately above the motor-compressor and condenser 24 and 26. As shown in FIG. 2, the space between the inner liner 32 and the outer shell throughout is filled with a suitable high structural strength, lightweight, foamed plastic material 46, preferably of the polyurethane class. Particularly, a rigid or semirigid, odorless polyurethane foam having a density of 1½–2½ lbs. per cu. ft., a yield point in compression of 20 to 30 lbs. per sq. in. having 90% closed cells, and a coefficient of thermal conductivity or "$k$" factor at 70° of from .1 to .16 B.t.u.-inch/hr.-sq. ft.-° F. as determined by the guard ring hot plate method, is most desirable. This makes it possible to reduce the wall thickness to 1 to 1⅝ in. for an ordinary household refrigerator. Examples of such insulating material are specified as Examples 1, 2 and 3 in the latter portion of this specification.

To seal this insulating material 46 and particularly to prevent any escape of the halo derivatives of the aliphatic hydrocarbons therein which might reduce its insulating properties, the exposed surface is coated throughout with a thin layer 49 of polyvinyl alcohol which is substantially alcohol which is substantially impermeable to such derivatives. This layer 49 extends from and bonds with the inner linear 32 to and bonding with the outer shell 20 and all the intervening area between the insulation 46 and the elastomer 50 hereinafter described. This layer 49 bonds to both the insulation 46 and the elastomer 50 throughout.

The door 36 which closes the compartment 30 has an outer shell 38 of metal or plastic which may be coated with porcelain or other enamel, and an inner panel 40 of plastic or metal which likewise may be coated with porcelain or other enamel. The outer door shell 38 may have an overlapping joint 42 with the inner door panel 40. The interior of the door 36 may be filled with the same foamed polyurethane insulation material 44 as the material 46 between the liner 32 and the outer shell 20. The inner panel 40 is provided with a bead 48 extending toward the insulation 46 entirely around the periphery of the door 36. The door 36 may be provided with a conventional latch, not shown.

The foamed polyurethane material 46 provides all the necessary support of the inner liner 32, thus making unnecessary the usual breaker strips ordinarily applied in four sections connnecting the inner linear and outer shell by many screws. It is also customary to provide a resilient door seal extending around either the door opening or door itself. Such a door seal is usually mechanically fastened by screws and clips or other devices also requiring considerable assembly time.

According to this invention, the resilient door seal is provided by a resilient elastomeric foam layer 50 provided on the front edge of the insulation 46 and bonded thereto with the polyvinyl alcohol layer 49 in between, both extending completely around the door opening. This layer 50 at the center is preferably of a thickness of about ½" and has a resiliency sufficient to permit a %4 deflection or impression of the bead into it at a pressure of from 9–18 ozs. for each foot of the bead 48. For example, if the bead 48 should be ¼" wide, this would mean a deflection force of 3 ozs. per sq. in., while if the width of the bead 48 is ½", this would require a force of 6 ozs. per sq. in. to achieve the %4 deflection or impression of the bead 48. This elastomeric foam layer 50 is preferably of the formulation set forth as Example A in the latter portion of the specification but may also be a latex foam or Example 1 or 2 of Patent 2,764,565 issued September 25, 1956.

This elastomeric foam layer 50 is preferably covered by a thin, flexible film 52 of polyester or other vapor barrier film which is attached by a suitable polyester or other suitable adhesive to the adjacent edge portions of the inner liner 32 and the outer shell 20, as is shown in FIG. 2. As an alternative, the layer 50 may be provided an adherent abrasion and moisture resistant decorative film of chlorosulfonated polyethylene or polyvinyl chloride. Also, if desired, a metallized polyester film or a laminated synthetic resin sheet material may be used for the flexible film 52. Preferably, this laminated material includes one layer of a synthetic resin which is a condensation product of ethylene glycol and terephthalic acid popularly known by the trade name "Mylar." On both sides of this layer is applied a thin coating of polyvinyl alcohol which, in turn, is coated with a layer of polyethylene. This serves as an effective barrier to water, moisture and gases but this film 52 may be omitted if its functions are adequately served by the surface skin upon the layer 50.

The back 66 of the cabinet preferably is separate from the outer shell. It may have a simple offset edge 74 overlying and overlapping the inturned rear flange 70 of the outer shell 20 as in FIG. 6, providing a simple overlap joint. Or, as in FIG. 7, a tongue-in-groove joint may be provided. In this form, the inturned rear flange 72 of the outer shell 20 has at its inner edge throughout a deep groove 73.

Figures 6, 7:
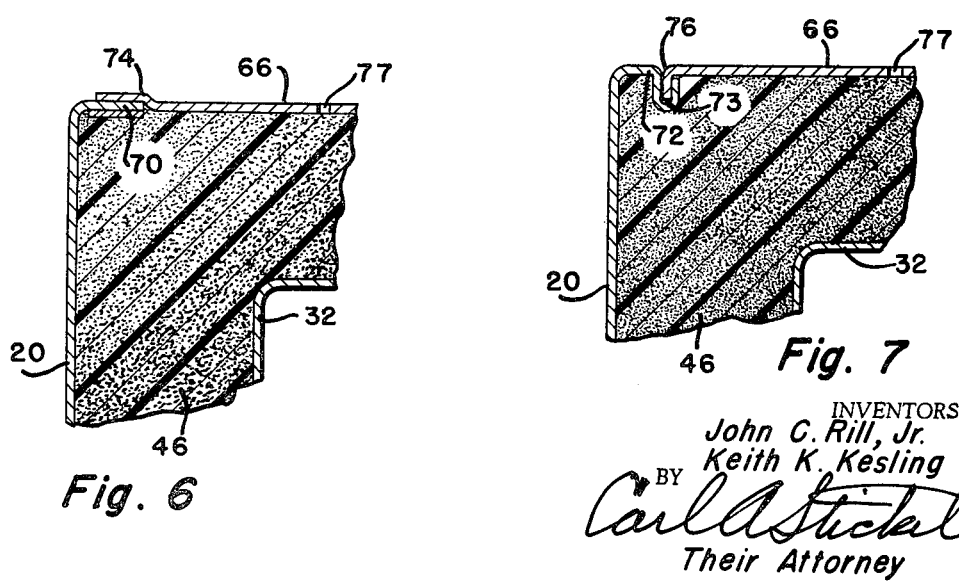
FIGURE 6 is a fragmentary horizontal sectional view of a rear corner of the cabinet.
FIGURE 7 is a similar fragmentary horizontal sectional view of a modified rear corner construction.

In FIG. 7, the back 66 has throughout its perimeter an inwardly turned right angle flange or tongue 76 extending into the deep groove 73 of the flange 72. This groove 73 is preferably filled with polyvinyl alcohol which forms a seal substantially impenetratable to halo derivatives of aliphatic hydrocarbons between the groove 73 and the flange 72.

The simple overlap joint of FIG. 6 preferably is also sealed throughout with polyvinyl alcohol extending between the offset edge 74 and the flange 70.

Particular examples of the formulation of the materials 44, 46 and 50, as mentioned heretofore, are specified in the following description of the preferred process developed for making this refrigerator. In this process, the box-shaped inner liner 32 with the front side open is supported within the outer shell in uniformly spaced relation by a suitable fixture or by four blocks 56 located between the corners of the liner 32 and the outer shell 20, as shown in dotted lines in FIG. 3. The flexible film 52 previously specified is then lightly stretched across the front edges of the inner liner 32 and the outer shell 20 and fastened by a suitable polyester or other adhesive to both edges. If desired, this film and the step of attaching it may be omitted, as previously suggested. After the adhesive has set, the assembled liner 32 and outer shell 20 are placed face-down upon the mold or support 58 which may be either flat or have a suitable rectangular groove into which the flexible film 52 may extend to provide whatever shape may be desired. Preferably, this groove may have a contour substantially complementary to the contour of the film 52 or the surface of the elastomeric layer 50 shown in FIG. 2, with the exception of the depression caused by the penetration of the bead 48. If the film 52 is omitted, a spray film of chlorosulfonated polyethylene or polyvinyl chloride is applied to this groove to form a decorative abrasion and moisture resistant film which will adhere to the layer 50.

The outer shell 20 has no back, as yet, upon it and therefore the back is entirely open. Its rear edge has a narrow inturned flange 70 as shown in FIG. 6. An alternate form of flange 72 with an outwardly facing deep groove 73, is shown in FIG. 7. As the first step in the face-down position, the fixture or blocks 56 may be removed through the open back. The synthetic elastomeric foamed material is flowed from the mixing nozzle 60 which is traversed over the film 52, or over the spray film in the groove of the support 58 within and entirely around the space between the inner liner 32 and the outer shell 20 to provide the layer 50 in the thickness previously specified.

*Example A*

This material forming the layer 50 preferably is a resilient elastomeric polyurethane foam which can be made from such compounds as are formed in the mixing nozzle 60 by the reaction of the following components. A prepolymer is formed by the combination of toluene diisocyanate 80% 2,4 isomer, 20% 2,6 isomer, and a polypropylene glycol and heat under anhydrous conditions. After cooling, the prepolymer is then reacted with an emulsifier such as an organo-silicone polymer, a catalyst such as N-methyl morpholine and water. These materials are supplied separately through the flexible conduits 62 and 64 and homogeneously mixed in the mixing nozzle 60. The mixing nozzle is introduced through the opening in the rear of the shell 20 and the material issuing therefrom is applied to the rear face of the flexible film 52 all around the front opening of the liner 32 until the material 50 is built up to a sufficient thickness of the elastomeric foam material to admit of a ⁹⁄₆₄ deflection with a pressure of 9–18 ozs. per lineal ft. of the bead 48. Instead of this particular compounded material, there may be substituted the material described in Example 1 and 2 of Patent 2,764,565 issued September 25, 1956, a latex foam or other equivalents.

After this elastomer 50 is set, onto its upturned or rear face, there is flowed or sprayed a solution of polyvinyl alcohol which may be made as follows:

Forty grams of polyvinyl alcohol powder are mixed cold with 480 grams water until blended. This mixture is heated to 200° F. and stirred for 20 minutes and then cooled to 120° F. To this mixture is added a mixture of 160 cc. of isopropyl alcohol and 160 cc. of water. The resulting solution is heated to 120° F. To a solution of 160 cc. water and 40 cc. isopropyl alcohol there is added 1.6 grams of Congo red. This is likewise heated to 120° F. and the two resulting solutions mixed and at a temperature of 120–140° F. are flowed or sprayed onto the elastomer 50.

Instead of the isopropyl alcohol, there may be substituted methyl, ethyl or normal propyl alcohol. Instead of the Congo red gelling agent, there may be substituted borax, gallic acid, alpha-naphthal, resorcinal, benzopurpine or the sodium salt of either salicylanilide, or beta-napthal salicylanilide or disalicylbensidine.

Over this layer of elastomeric foamed material forming the resilient door seal 50 and the polyvinyl alcohol layer 49, there is flowed the foamed insulation material 46. This is cast in between the liner 32 and the outer shell 20 while they remain in the position shown in FIG. 4. After the material forming the foamed insulating material 46 is inserted in between the inner liner 32 and outer shell 20, the back 66 is applied and firmly held in place. This back 66 may have several small perforations 77 to permit the escape of excess insulating material 46. After the insulating material 46 has solidified, it firmly holds the back 66 in place. The excess insulating material which has passed through the escape perforations 77 is removed and the perforations 77 as well as the joint between the edges of the back wall 66 and flanges 70 or 72 are sealed by a liquid flow application of the polyvinyl alcohol solution referred to with respect to the layer 49. This is flowed along the edge of the back 66 in FIG. 6. In FIG. 7, the polyvinyl alcohol solution is flowed into the deep groove 73 to seal the flange 76 throughout. While many foamed materials can be used in the insulation space, because of their high structural strength, high insulating value and low weight and their excellent adhesive properties, the polyurethane foams are the most desirable of the materials available at the present time.

One example of the polyurethane foamed insulation may be mixed of components which lead to the production of polyurethane plastics accompanied by an evolution of carbon dioxides.

*Example 1.*—An ethylene glycol-adipic acid polyester was prepared having a hydroxyl number of about 440, an acid number of about 1.5 and a water content of about .5% by weight. A portion of the polyester was reacted with an isocyanate mixture consisting of about 80% by weight 2,4 toluene diisocyanate and 20% by weight 2,6 toluene diisocyanate to produce a polymer having an isocyanate equivalent of about .80 per 100 grams of the isocyanate-modified polyester. The isocyanate-modified polyester was placed in a tank and a mixture of 60 parts by weight of the ethylene glycol-adipic acid polyester, .25 part of dimethyl ethanolamine, 2.5 parts by weight of water and 1.5 parts by weight of polyoxyethylene sorbitan monopalmitate as an emulsifier was placed in a second tank. The two components were separately supplied through the conduits 62, 64 to the mixer 60 having a rotor rotated at about 3,000–5,000 r.p.m. and mixed in a ratio of 63.75 of the latter to 100 parts by weight of the former to produce a carbon dioxide blown foam having a density of about 2 lbs. per cu. ft. and initial coefficient of thermal conductivity or "k" factor at 70° F. of about .157 B.t.u.-inch/hr.-sq. ft.-° F. as determined by the guard ring hot plate method. Due to leakage, this coefficient increases and eventually stabilizes at the range of .22–.26.

However, as preferred examples, the production of the insulation involves components which, when mixed, produce polyurethane plastics which on reaction are *not* accompanied by any substantial evolution of carbon dioxide nor any gaseous product having a coefficient of thermal conductivity similar to or greater than that of carbon dioxide. Instead, a liquid blowing agent is used which is evaporated by the heat of the reaction and has an appreciable lower thermal conductivity than carbon dioxide. The components mixed involve a first polymeric component or resin containing reactive hydrogen groups other than carboxyl groups in appreciable amounts, a second component which is an organic polyisocyanate; and a third component which promotes the reaction and may include cross linking and accelerating agents other than water.

Examples of suitable polymeric components include polyesters such as the reaction product of adipic acid and polyethylene glycol having a very small or negligible acid number. Various polyesters or polyesteramides which may be used for the production of polyurethanes of the present invention may be obtained by condensing a variety of poly-basic acids, preferably dibasic acids such as adipic, sebacic, phthalic, oxalic, malonic, succinic, maleic, fumaric, itaconic, etc., with polyalcohols such as ethylene glycol, diethylene glycol, glycerol, sorbitol and/or amino alcohols such as ethanolamine and aminopropanol. Alkylene glycols and polyoxyalkylene glycols which may be used include ethylene glycol, propylene glycol, styrene glycol, diethylene glycol, polyethylene glycol, polypropylene glycol and copolymers of these glycols. A high-grade caster oil having a very small or negligible acid number may also be used.

Examples of suitable organic polyisocyanates include aromatic diisocyanates such as toluene 2,4 diisocyanate, toluene 2,6 diisocyanate and mixtures thereof, naphthalene 1,5 diisocyanate and M-phenolene diisocyanate. Various polyisocyanates referred to in the patents set forth in this specification may also be used.

Examples of components promoting the polyaddition reaction of the first two mentioned components to provide an essential accelation of the reaction include ethylethanolamine, diethylethanolamine, pyridine, hexahydrodimethylaniline, methyl piperazine, dimethyl piperazine, tribenzylamine, N-morpholine and K-methyl morpholine.

The components referred to above may be modified in a variety of ways to produce a reacting mixture leading to the production of solid polyurethane plastics not accompanied by the evolution of substantial amounts of carbon dioxide or other gaseous products. Thus, the polymeric component may be initially reacted with the polyisocyanate to form a polyisocyanate-modified polymer having a predetermined percentage of free isocyanate groups or a predetermined percentage of hydrogen reactive groups. In the latter case, it is necessary to include cross linking or chain extending components having reactive hydrogen groups, such as ethylene glycol, into the reaction. Components such as trimethylol propane, polypropylene glycol, polyethylene glycol, or a polyester having a very small or negligible acid number may be utilized for this purpose. The essential character of a suitable formulation in accordance with the present invention is that the components selected lead to the formation of solid polyurethane plastics without an appreciable evolution of carbon dioxide gas.

The preparation of the foamed polyurethane insulation of the present invention involves the introduction of the components leading to the formation of polyurethane plastics referred to above into an enclosed mixing zone substantially simultaneously with the introduction of a liquid which will vaporize as a consequence of the heat generated by the reacting component and having desirable thermal properties in a gaseous or vapor state. The following are examples of polyurethane foams suitable for the insulation 44 and 46. The components may be introduced through one or more flexible conduits connecting with a mixing nozzle identical or similar to the conduits 62 and 64 and the mixing nozzle 60. To introduce these components through the flanged opening in the rear wall of the shell 20, the nozzle is traversed around the space between the inner liner 32 and the outer shell 20 and thence traversed over the upwardly turned rear wall of the liner 32 until sufficient material is introduced which, when completely foamed, will fill the entire insulation space. Immediately after this, the back 66, which may be of metal or plastic or suitably treated fibreboard, provided with suitable small escape apertures is placed on the back of the shell 20 and held in place until the foaming and setting of the material is sufficiently complete. This back 66 is supported by the flanges 70 or 72 extending around the rear edge of the outer shell 20 as in FIGS. 6 or 7 and has either the offset edge 74 as in FIG. 6 or the inwardly turned flange 76 extending into the deep groove 73. Specific formulations follow.

*Example 2.*—An ethylene glycol-adipic acid polyester was prepared having a hydroxyl number of about 430, an acid number of about 1.50 and a negligible water content. A portion of the polyester was reacted with the toluene diisocyanate to produce an isocyanate modified polyester having an isocyanate equivalent of about .80 per 100 grams of the isocyanate-modified polyester. A mixture of 100 parts by weight of the above mentioned isocyanate-modified polyester, .50 part by weight of polyoxyethylene sorbitan monopalmitate, and 30 parts by weight of trichloromonofluoromethane (F-11) was placed in a tank and kept cool, such as below 50° F. A mixture of 60 parts by weight of the ethylene glycol-adipic acid polyester, 12 parts by weight of ethylene glycol, .25 part by weight of dimethyl ethanolamine and .25 part by weight of polyoxyethylene sorbitan monopalmitate emulsifier was placed in another tank. The components from the two tanks were supplied separately through the conduits 62, 64 to the mixer 60 and mixed as before at a ratio of 130.50 parts by weight of the former to 72.50 parts by weight of the latter. The mixed components issuing from the mixer 60 were deposited in the insulation space between the inner liner 32 and the outer shell 20. After two minutes the temperature of the reacting mixture rose to about 250° F. and a foamed product was produced in the insulation space having a density of about 2 lbs. per cu. ft. and having a "$k$" factor at 70° F. of about .100 B.t.u.-inch/hr.-sq. ft.-° F. as determined by the guard ring hot plate method.

*Example 3.*—The process of Example 2 was repeated utilizing trichlorotrifluoroethane (F-113) having a boiling point of about 118° F. instead of the trichloromonofluoromethane (F-11) to produce a foam structure having a "$k$" factor at 70° F. of .100 B.t.u.-inch/hr.-sq. ft.-° F. as determined by the guard ring hot plate method.

It is apparent that the foaming of the material described in the above Examples 2 and 3 results in the main from the vaporization of the liquid trichloromonofluoromethane (F-11) or the trichlorotrifluoroethane (F-113) respectively due to the exothermic heat of reaction. Other liquids such as dichloromonofluoromethane (F-21), monochloroethane, monochloromonofluoroethane (F-151a), monochlorodifluoroethane (F-142a) and trifluorodichloroethane (F-133e) having boiling points ranging from 48° F. to 95° F. and coefficients of thermal conductivity substantially less than that of carbon dioxide, may also be used. These materials do not have a tendency to appreciably retard the reaction rate as does sulphur dioxide, for example, and they vaporize readily in the process due to the heat generated in the reaction. Further, these materials are inert so that they may be fed into the reaction mixture either in admixture with one of the polyurethane components, as illustrated in the above example, or separately.

It is, of course, understood that various details of construction, styling and materials may be changed, substituted and modified without changing the essential character of the invention in which the principal features are the support of the inner liner and the door seal solely by the insulation and the absence of the usual breaker strips and mechanical support of the door seal.

While the embodiment of the invention as herein disclosed constitutes a preferred form, it is to be understood that other forms might be adopted, as may come within the scope of the claims which follow.

What is claimed is as follows:

1. The process of making an insulated cabinet which includes providing a box-shaped inner liner with an open side, placing an outer shell in the general form of a rectangular tube over the liner and spaced therefrom on all sides, bonding a film of flexible moisture barrier material to the edges of the shell and the liner all around the open side so that the film extends between and connects said edges, placing the assembled structure with the film face down upon a support, introducing through the opening in the shell opposite the open side a fluid capable of forming a resilient elastic closed cell foam material and distributing this foam material over all the film between the edges of the liner and shell to a thickness permitting a substantial amount of deflection, then introducing through the same opening in the shell opposite the open side a fluid capable of forming a foam material having greater rigidity and insulating properties sufficient in quantity to substantially fill the space between the outer shell and the liner as well as the space within the shell above the rear wall of the liner, and after filling these spaces with this last named foam material applying a back outer panel to the shell to complete the structure.

2. The process of making an insulated cabinet having an inner liner and an outer shell with adjacent open sides providing a door opening which includes placing a box-shaped inner liner with an open side on a laterally extending support with the open side down facing the support, placing an outer shell having an open side down and extending over the liner with the open sides adjacent and with the edges bordering both open sides spaced from each other on all sides, thence through an opening in said shell opposite said door opening flowing a fluid capable of forming a resilient insulation material between and bonding to and closing the space between the portion of the liner and shell immediately adjacent the edges bordering the open sides, and thereafter through an opening in said shell opposite said door opening introducing into the remaining space between the inner liner and the shell and onto the inner surface of said resilient material a sufficient amount of a mixture of components capable of reacting to form a substantially rigid foamed plastic resin to substantiallly fill the remainder of the space between the inner liner and outer shell to provide a substantial support as well as insulation for said inner liner.

References Cited by the Examiner

UNITED STATES PATENTS

| | | |
|---|---|---|
| 2,106,840 | 2/1938 | Gould. |
| 2,216,830 | 10/1940 | Roberts. |
| 2,552,641 | 5/1951 | Morrison. |
| 2,653,139 | 9/1953 | Sterling. |
| 2,706,311 | 4/1955 | Durst et al. |
| 3,037,652 | 6/1962 | Wallace _____ 264—45 |

EARL M. BERGERT, *Primary Examiner.*